United States Patent
Kuwahara et al.

(10) Patent No.: US 7,929,986 B2
(45) Date of Patent: Apr. 19, 2011

(54) RECEIPT NOTIFYING PROGRAM, RECEIPT NOTIFYING METHOD, AND MOBILE TERMINAL APPARATUS

(75) Inventors: Soichi Kuwahara, Koto (JP); Yasunori Tachibana, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 933 days.

(21) Appl. No.: 11/697,003

(22) Filed: Apr. 5, 2007

(65) Prior Publication Data

US 2007/0218884 A1    Sep. 20, 2007

Related U.S. Application Data

(63) Continuation of application No. PCT/JP2004/014914, filed on Oct. 8, 2004.

(51) Int. Cl.
*H04M 1/00* (2006.01)

(52) U.S. Cl. ............... 455/550.1; 455/566; 715/752; 715/763; 715/864

(58) Field of Classification Search ............ 345/745; 705/14; 455/415, 445, 550.1, 412.1, 412.2, 455/413, 414.1–414.4, 556.1, 556.2, 557, 455/466, 417, 566; 370/254; 715/715, 752, 715/763–772, 788, 791, 792, 793, 747, 810, 715/825, 826, 828, 829, 837, 838, 847, 864
See application file for complete search history.

(56) References Cited

U.S. PATENT DOCUMENTS

| | | | |
|---|---|---|---|
| 6,456,841 B1 | 9/2002 | Tomimori | |
| 6,628,971 B1 * | 9/2003 | Yoon et al. | 455/566 |
| 2001/0010525 A1 * | 8/2001 | Fukuda et al. | 345/788 |
| 2001/0012790 A1 * | 8/2001 | Park et al. | 455/565 |
| 2002/0024536 A1 * | 2/2002 | Kahan et al. | 345/745 |
| 2004/0172326 A1 * | 9/2004 | Yeo et al. | 705/14 |

FOREIGN PATENT DOCUMENTS

| | | |
|---|---|---|
| CN | 1247441 | 3/2000 |
| JP | 2000-83282 | 3/2000 |
| JP | 2000-253106 | 9/2000 |
| JP | 2001-333153 | 11/2001 |
| JP | 2003-8698 | 1/2003 |
| JP | 2003-101628 | 4/2003 |
| JP | 2003-169372 | 6/2003 |
| JP | 2003-258950 | 9/2003 |
| JP | 2004-7144 | 1/2004 |
| JP | 2004-007144 | 1/2004 |
| WO | 01/91424 | 11/2001 |

OTHER PUBLICATIONS

International Search Report (mailed on Nov. 22, 2004) for the International application No. PCT/JP2004/014914.

* cited by examiner

*Primary Examiner* — Kent Chang
*Assistant Examiner* — San Htun
(74) *Attorney, Agent, or Firm* — Staas & Halsey LLP

(57) ABSTRACT

When data such as a mail is received, a key input state such as a key operation frequency with respect to an active application is detected, and whether display of an application screen is to be prioritized or display of a receipt notification is to be prioritized is determined according to the time interval of key inputs. When prioritized display of the application screen is determined, the receipt notification is displayed so that it does not affect the application screen. Meanwhile, if prioritized display of the receipt notification is determined, the receipt notification is displayed and controlled so that it is on the front of the application screen.

15 Claims, 10 Drawing Sheets

FIG. 3A

| APPLICATION NAME | KEY INPUT DETERMINATION CRITERIA OF APPLICATION PRIORITY |
|---|---|
| GAME | KEY INPUT WITHIN 5 SECONDS |
| MEMO PAD | KEY INPUT WITHIN 10 SECONDS |
| BROWSER | KEY INPUT WITHIN 15 SECONDS |

FIG. 3B

| APPLICATION NAME | KEY INPUT FIRST DETERMINATION CRITERIA OF APPLICATION PRIORITY | KEY INPUT SECOND DETERMINATION CRITERIA OF APPLICATION PRIORITY |
|---|---|---|
| GAME | KEY INPUT WITHIN 5 SECONDS | KEY INPUT WITHIN 10 SECONDS |
| MEMO PAD | KEY INPUT WITHIN 10 SECONDS | KEY INPUT WITHIN 20 SECONDS |
| BROWSER | KEY INPUT WITHIN 15 SECONDS | KEY INPUT WITHIN 30 SECONDS |

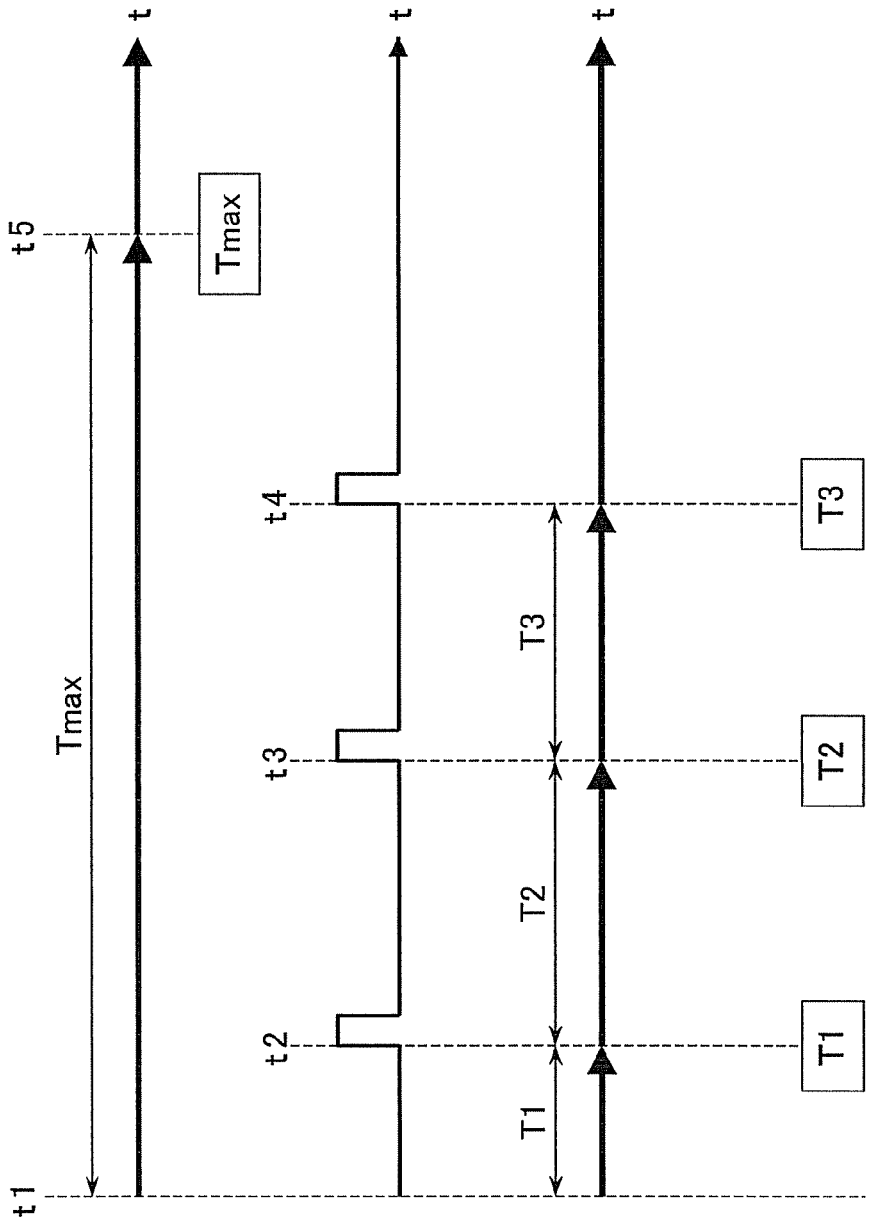

RECEIPT NOTIFYING PROGRAM, RECEIPT NOTIFYING METHOD, AND MOBILE TERMINAL APPARATUS

This application is a continuation of PCT/JP2004/14914, filed Oct. 8, 2004.

TECHNICAL FIELD

The present invention relates to a receipt notifying program, a receipt notifying method, and a mobile terminal apparatus which display a receipt notification on a screen when information from a network, such as a mail, is received and particularly relates to a receipt notifying program, a receipt notifying method, and a mobile terminal apparatus which appropriately display a receipt notification with respect to an image display of an active application.

BACKGROUND ART

Conventionally, in a mobile phone, when a mail or the like is received, a receipt notification is displayed on a standby screen. Also, when a mail or the like is received while a user is using an application of the mobile phone, a receipt notification is displayed on an application screen.

Among these, the following two methods are the mainstream as the display methods of receipt notifications during application activation.

In a first receipt notification display method, as shown in FIG. 1A, during application activation, a PICT 102 using a small icon is displayed at a corner of an application screen 100 so as to inform receipt.

In a second receipt notification display method, as shown in FIG. 1B, even during application activation, receipt is prioritized over the application, and a receipt notifying message 104 is displayed on the front of the application screen 100 in addition to display of the PICT 102.

Patent Document 1: Japanese Patent Application Laid-Open (kokai) No. 2000-083282
Patent Document 2: Japanese Patent Application Laid-Open (kokai) No. 2003-008698

DISCLOSURE OF INVENTION

However, in such a conventional display method of receipt notification, the case of FIG. 1A has a drawback that a user cannot be readily aware of the mail receipt since the PICT 102 displayed at a corner screen is small. Also, the case of FIG. 1B has a problem that, when a mail is received while a user is writing a mail or playing a game, the receipt notifying message 104 is displayed on the front of the application screen 100 such that it cannot be seen temporarily, and the user operation is interrupted.

Also, there is a method in which a function that a user can select the display of FIG. 1A or the display of FIG. 1B by setting is equipped; however, the user has to determine and change the setting in accordance with, for example, the way of using the application and importance of the mail, and operationality viewed from the user is not so good anyway.

Furthermore, the screen is small in a small mobile terminal apparatus such as a mobile phone such that one activated application occupies the screen merely by itself, and it is difficult to implement display of both the application and a receipt notification at the same time.

It is an object of the present invention to provide a receipt notifying program, a receipt notifying method, and a mobile terminal apparatus which can dynamically change the screen display of a receipt notification during application activation to an optimal display state in accordance with the way of using the application.

The present invention provides a receipt notifying program executed by a computer of a mobile terminal apparatus. The receipt notifying program of the present invention is characterized by causing a computer of a mobile terminal apparatus to execute a key detecting step of detecting a key input state with respect to an active application when data such as a mail is received;

a determination step of determining whether display of an application screen is to be prioritized or display of a receipt notification is to be prioritized according to the detected key input state; and a receipt display control step of displaying the receipt notification so that the notification does not affect the application screen when prioritized display of the application screen is determined and displaying and controlling the receipt notification so that the notification is on the front of the application screen when prioritized display of the receipt notification is determined.

Herein, in the receipt display control step, after the receipt notification is displayed so that the notification does not affect the application screen, when prioritized display of the receipt notification is determined according to the key input state in the determination step, the display is changed to display of the receipt notification which is on the front of the application screen.

Moreover, in the receipt display control step, after the receipt notification is displayed on the front of the application screen, when prioritized display of the application screen is determined according to the key input state in the determination step, the display is changed to display of the receipt notification which does not affect the application screen.

In the determination step, a determination criterion of the key input state is set in advance, the detected key input state is compared with the determination criterion so as to determine whether the display of the application screen is to be prioritized or the display of the receipt notification is to be prioritized.

Moreover, the determination step may be arranged so that the determination criterion is set for each application, and the determination criterion corresponding to the active application is acquired so as to determine the key input state.

The determination step may be arranged so that, as the determination criteria, a first determination criterion for displaying the receipt notification at first and a second determination criterion for changing the display of the receipt notification after the receipt notification is displayed are individually set, wherein the first determination criterion is different from the second determination criterion.

In the key detecting step, a time interval of key inputs is detected; and, in the determination step, determination time of a time interval of key inputs is set as the determination criterion, prioritized display of the application screen is determined when a detected time interval of key inputs is equal to or less than the determination time, and prioritized display of the receipt notification is determined when the detected time interval of the key inputs exceeds the determination time.

The present invention provides a receipt notifying method of a mobile terminal apparatus. The receipt notifying method of the present invention is characterized by including a key detecting step of detecting a key input state with respect to an active application when data such as a mail is received;

a determination step of determining whether display of an application screen is to be prioritized or display of a receipt notification is to be prioritized according to the detected key input state; and a receipt display control step of displaying the receipt notification so that the notification does not affect the application screen when prioritized display of the application screen is determined and displaying and controlling the receipt notification so that the notification is on the front of the application screen when prioritized display of the receipt notification is determined.

The present invention provides the mobile terminal apparatus. The mobile terminal apparatus of the present invention is characterized by having a key detecting unit which detects a key input state with respect to an active application when data such as a mail is received;

a determination unit which determines whether display of an application screen is to be prioritized or display of a receipt notification is to be prioritized according to the detected key input state; and a receipt display control unit which displays the receipt notification so that the notification does not affect the application screen when prioritized display of the application screen is determined and displays and controls the receipt notification so that the notification is on the front of the application screen when prioritized display of the receipt notification is determined.

Note that details of the receipt notifying method and the mobile terminal apparatus according to the present invention are basically same as the receipt notifying program.

According to the present invention, when, for example, the state in which the frequency of key inputs is high is detected, priority of an application is determined, and a small receipt notification is displayed at a corner of an application screen; thus, under the circumstances in which interruption during application activation, for example, during a game or during mail creation, is desired to be avoided, the receipt notification of the mail does not cause any trouble, and the receipt can be noticed even when it is left unoperated in the state in which the application is activated.

Meanwhile, when the state in which the frequency of the key inputs is low is detected even during activation of the application, for example, the state in which a mail creation screen is kept open or when contents are merely seen by a browser, interrupting the application screen does not cause any trouble; therefore, the receipt notification is displayed largely at the center of the front of the application screen so that it is noticeable, thereby reliably informing the receipt.

When there is no key input for a certain period of time after the small receipt notification is displayed at the screen corner in the state that the key input frequency is high, it is switched to the display in which the receipt notification is large and noticeable at the screen center, thereby preventing oversight of a mail or the like.

By contraries, when key input is started after the receipt notification is largely displayed at the screen center in the state that there is no key input, the receipt notification is switched to the small display at the screen corner, and the application can be used without being bothered by the receipt notification.

BRIEF DESCRIPTION OF DRAWINGS

FIGS. 3A and 3B are explanatory diagrams of determination criteria used in determination of the key input state of FIGS. 2A and 2B;

FIGS. 7A to 7D are time charts of the key detection process of FIG. 6; and

BEST MODE FOR CARRYING OUT THE INVENTION

Figure 1A:
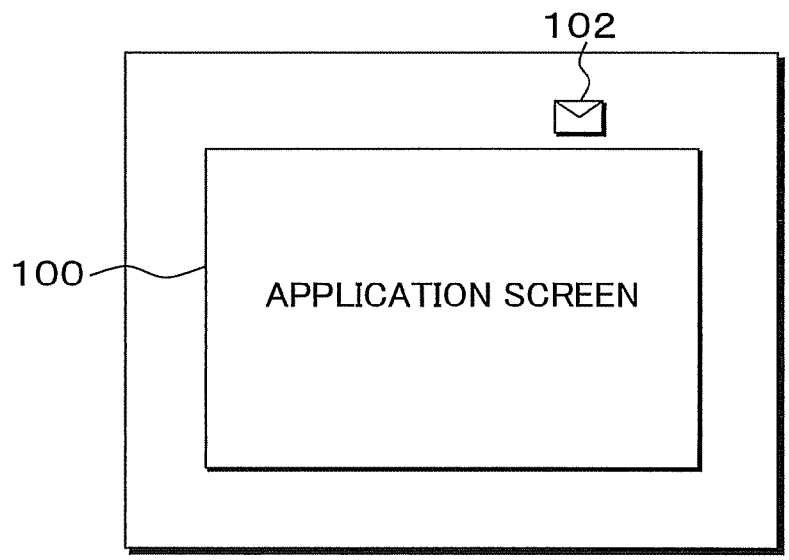
FIGS. 1A and 1B are explanatory diagrams of receipt display during application activation in a conventional mobile phone.
Figure 1B:
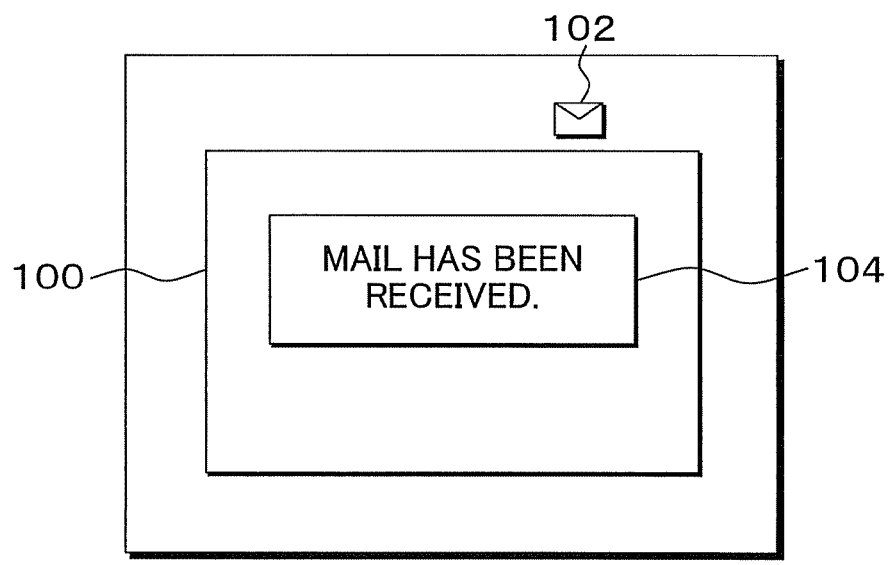
Figure 2A:
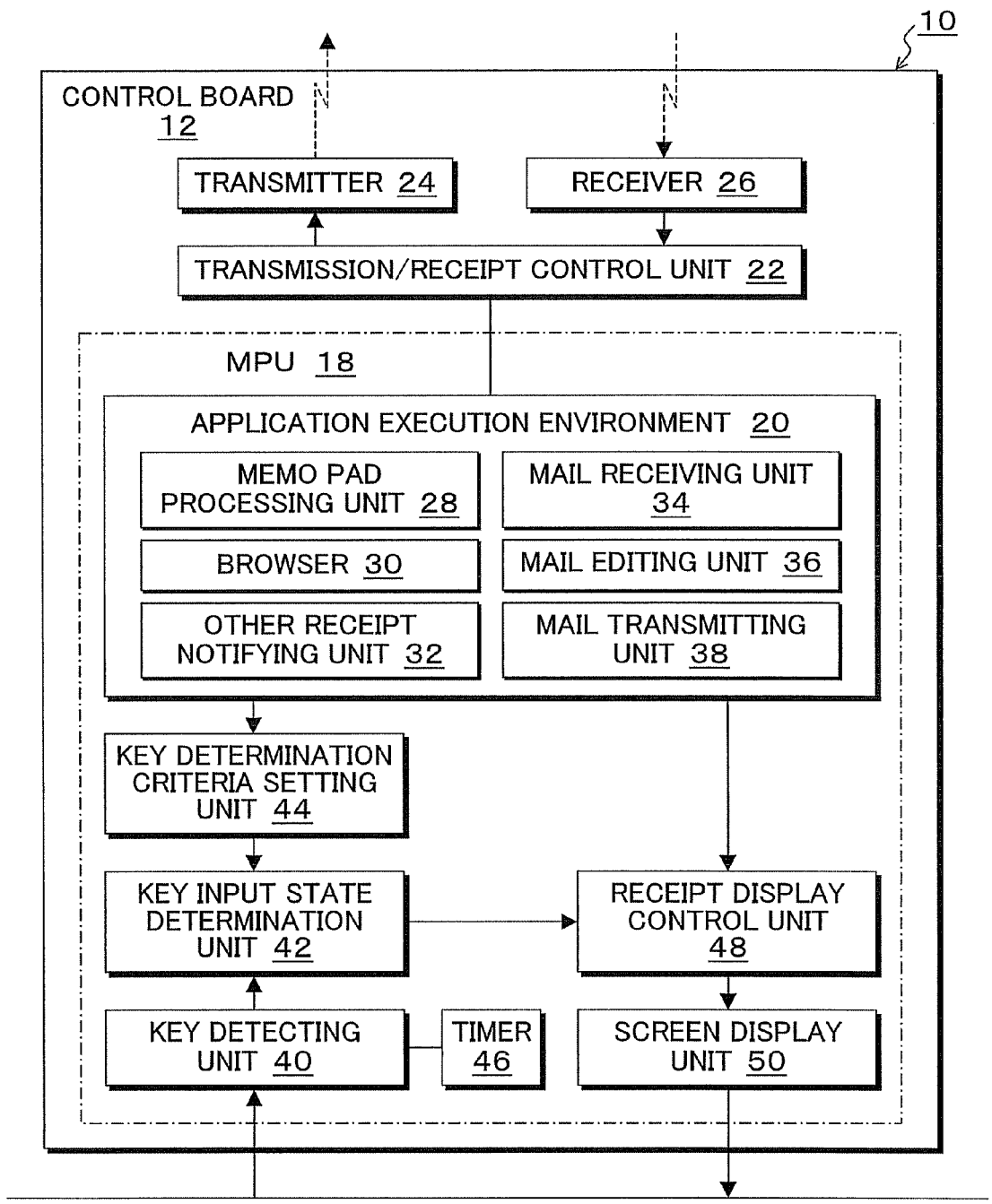
FIGS. 2A and 2B are block diagrams of a mobile phone having a receipt notification function according to the present invention.
Figure 2B:
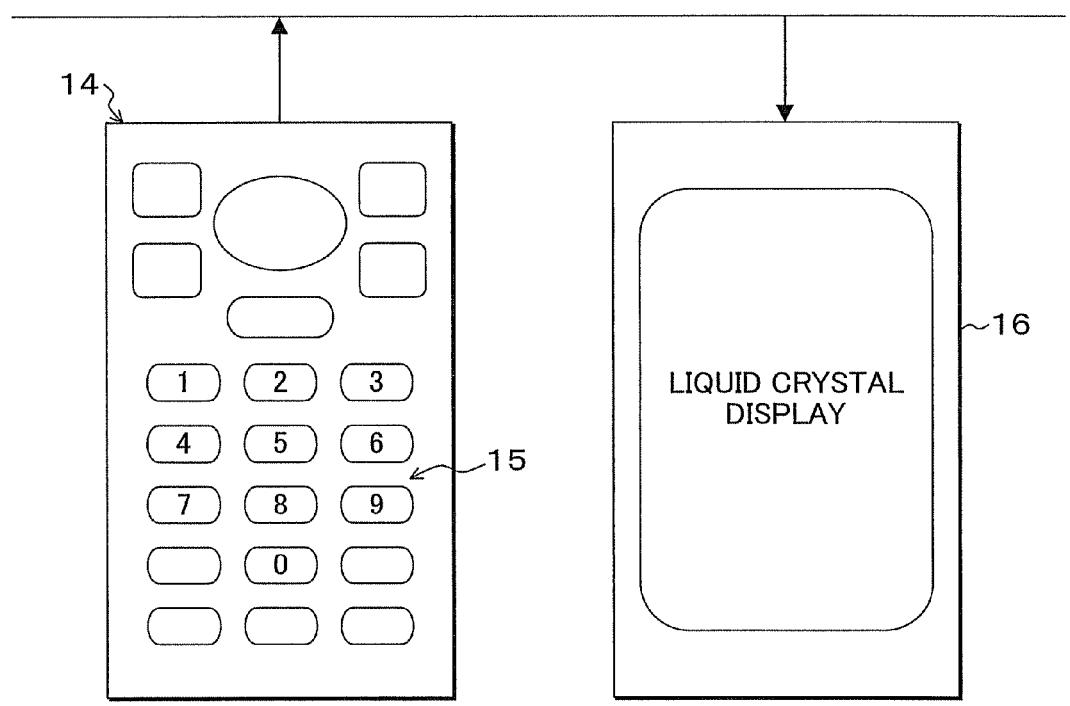

FIGS. 2A and 2B are block diagrams of a mobile phone having a receipt notifying function according to the present invention. In FIGS. 2A and 2B, the mobile phone 10 is composed of a control board 12, a key input unit 14 having a plurality of keys 15, and a liquid crystal display unit 16 which can perform color display.

A MPU 18 is mounted on the control board 12, the key input unit 14 and the liquid crystal display unit 16 are connected to the MPU 18, and it is connected to a transmitter 24 and a receiver 26 via a transmission/receipt control unit 22. The transmitter 24 and the receiver 26 perform wireless information transfers in accordance with a mobile phone communication protocol between the mobile phone and a base station.

In the MPU 18, an application execution environment 20 is provided. In the application execution environment 20, in this embodiment, a memo pad processing unit 28, a browser 30, and another receipt notifying unit 32 are provided; and, furthermore, a mail receiving unit 34, a mail editing unit 36, and a mail transmitting unit 38 are provided as mail-related units.

Each application provided in the application execution environment 20 is executed by a CPU of the MPU 18, an application screen is displayed on the front surface of the liquid crystal display unit 16 when the application is activated, and a user operates the keys 15 of the key input unit 14 while seeing the application screen of the liquid crystal display unit 16, thereby performing necessary input/output.

With respect to the application execution environment 20, in order to realize the receipt notifying function of the present invention, a key detecting unit 40, a key input state determination unit 42, a key determination criteria setting unit 44, a timer 46, a receipt display control unit 48, and a screen display unit 50 are provided.

The key detecting unit 40 detects the key input state according to operation of any of the keys 15 in the key input unit 14 during activation of an application, for example, during activation of the browser 30. The detection of the key input state specifically uses the timer 46 and detects the time intervals of key inputs.

The key input state determination unit 42 determines whether display of an application screen is to be prioritized or display of a receipt notification is to be prioritized in accordance with the key input state obtained from the key detecting unit 40. The determination of the key input state is performed based on determination criteria set by the key determination criteria setting unit 44.

For example, in the case in which a time interval of key inputs is given as the key input state from the key detecting unit 40, the key determination criteria setting unit 44 sets, for example, 5 seconds as determination criteria time, the key input frequency is determined to be high if the time interval of the key inputs is within 5 seconds, and prioritized display of the application screen is determined.

On the other hand, if the time interval of the key inputs is over 5 seconds of the key determination criteria interval, the frequency of the key inputs is determined to be low, and prioritized display of a receipt notification is determined. Herein., the determination criteria according to the key determination criteria setting unit 44 are determined for each application provided in the application execution environment 20.

FIG. 3A is an explanatory diagram of a determination criteria table 52 used in the key determination criteria setting unit 44. In the determination criteria table 52, application names 54 and key input determination criteria 56 of application priority are set. For example, as the application names 54, for example, game, memo pad, and browser are set; and, as the key input determination criteria of receipt display priority, 5-second interval key inputs are set for the game, 10-second interval key inputs are set for the memo pad, and 15-second interval key inputs are set for the browser.

FIG. 3B is another determination criteria table 58 set by the key determination criteria setting unit 44 of FIGS. 2A and 2B. In this determination criteria table 58, with respect to the application names, two sets of criteria, i.e., key input first determination criteria 62 of receipt display priority and key input second determination criteria 64 of receipt display priority are set.

Among these, the first determination criteria 62 are determination criteria used when a mail is received first and receipt display is to be notified, and the second determination criteria 64 are determination criteria used when change in the key input state is determined so as to change the display state of the receipt notification after receipt display is performed in accordance with the first determination criteria 62.

Also in the determination criteria table 58 of FIG. 3B, game, memo pad, and browser are recorded as application names 60; and, although the input key first determination criteria 62 of application priority are same as the key input determination criteria 56 of FIG. 3A, the key input second determination criteria 64 are additionally set, and the time twice that of the first determination criteria 62 is set in this case.

As a matter of course, when the determination criteria table 52 of FIG. 3A is used, the same key input determination criteria 56 of application priority are used both in the receipt display according to determination of the key input state upon first mail receipt and in the display change of the receipt display according to change in the key input state thereafter.

Figure 4A:
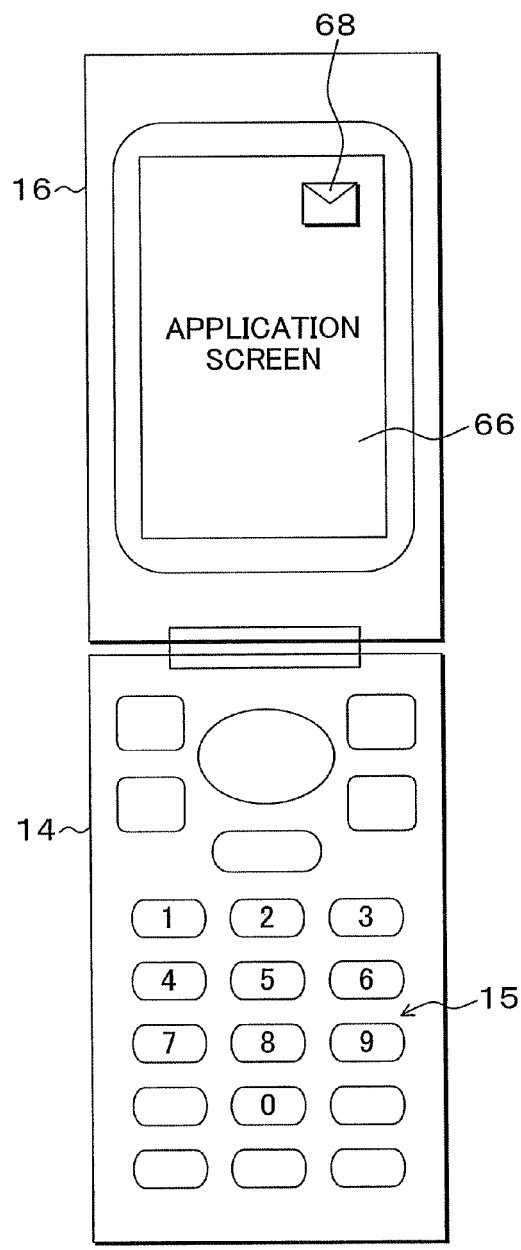
FIGS. 4A and 4B are explanatory diagrams of receipt display during application activation according to the present invention.
Figure 4B:
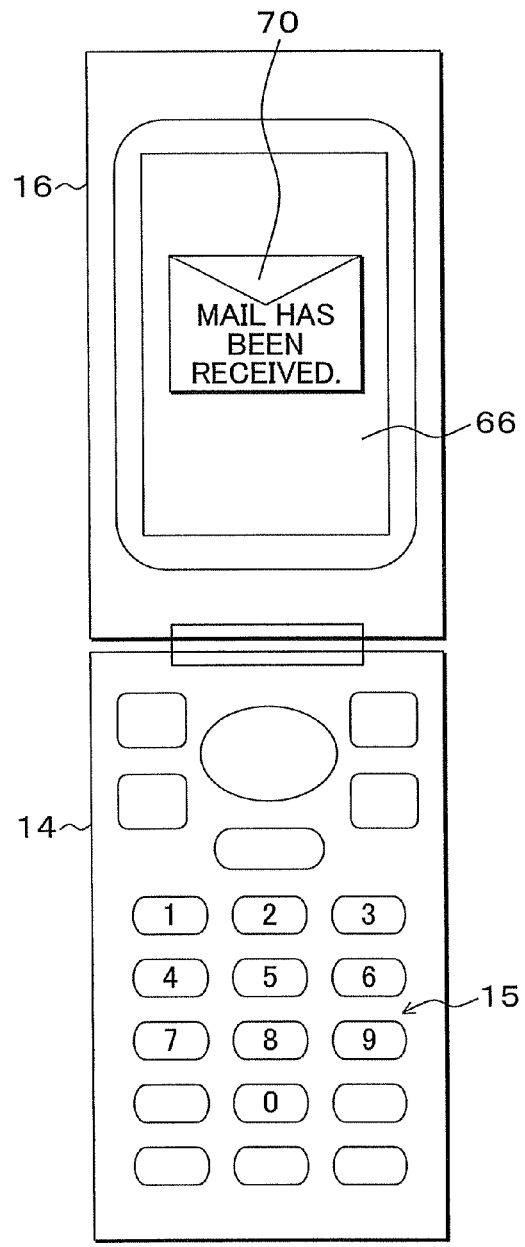

FIGS. 4A and 4B are explanatory diagrams of receipt display during application activation in. the mobile phone 10 of FIGS. 2A and 2B. FIG. 4A shows the case in which prioritized display of an application screen is determined by the key input state determination unit 42, and an application screen 66 corresponding to an active application is shown across the entire screen of the liquid crystal display unit 16; and, since, in this state, a mail is received and prioritized display of the application screen is determined as a key input state, a small PICT 68, which is a small icon indicating a receipt notification, is displayed at an upper right corner of the application screen 66.

FIG. 4B shows the case in which prioritized display of a receipt notification is determined by the key input state determination unit 42, wherein a receipt notifying message 70 is largely displayed on the front at the center of the application screen 66 so that it is noticeable.

In other words, according to the present invention, if key inputs are frequently performed during application activation, the small PICT 68 is displayed as a receipt notification at a corner of the screen so that the application screen 66 is not interrupted as shown in FIG. 4A; meanwhile, if key inputs are not performed during the application activation, and key inputs are scarcely performed, for example, like when a browser is activated and contents are seen, the receipt notifying message 70 is largely displayed at the center of the application screen 66 as shown in FIG. 4B.

Figure 5:
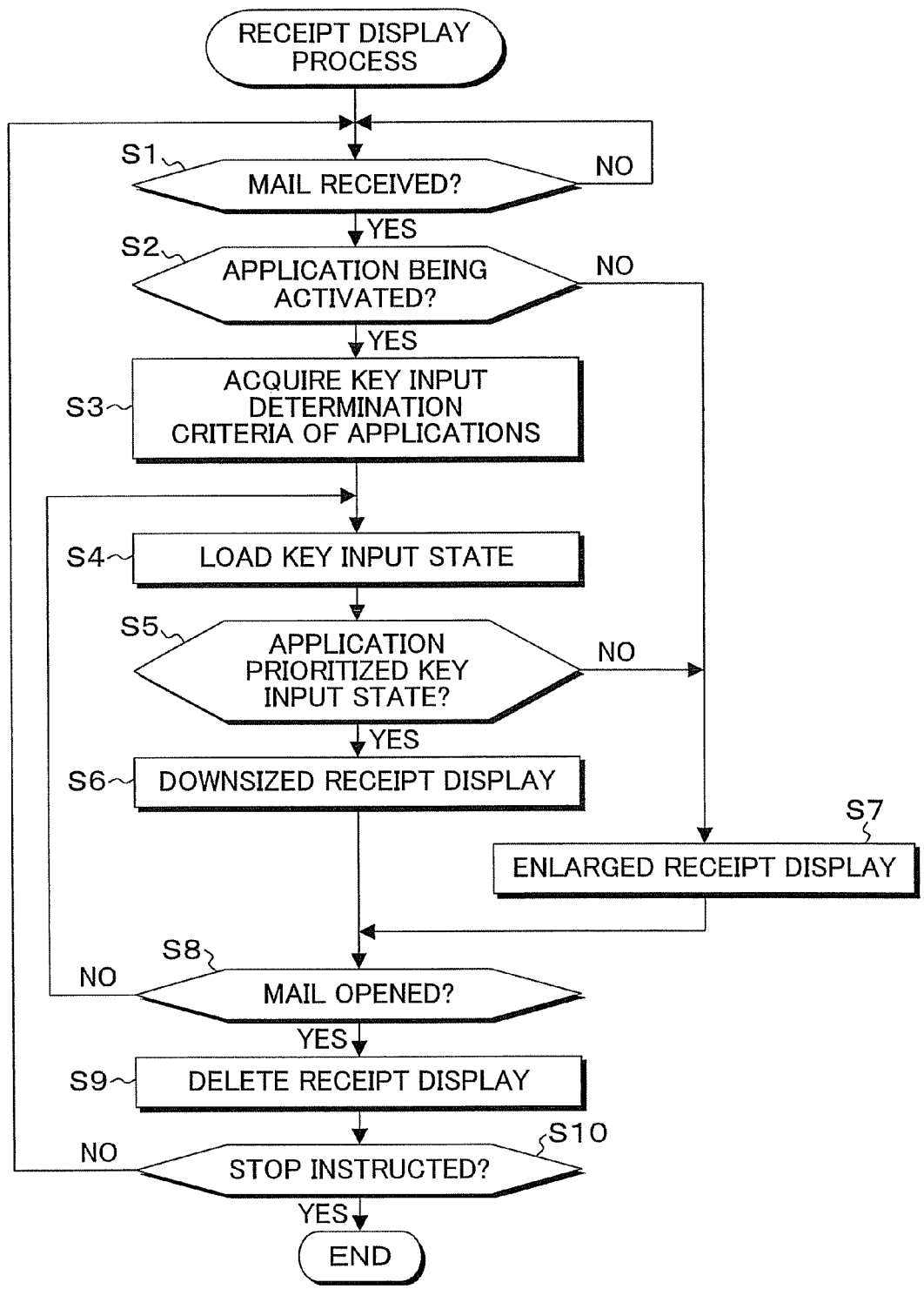
FIG. 5 is a flow chart of a receipt notifying process according to the present invention.

FIG. 5 is a flow chart of a receipt notifying process according to the present invention, and it is the case in which the determination criteria table 52 of FIG. 3A is used as the determination criteria of the key input state.

In FIG. 5, whether a mail is received or not is checked in step S1; and, when the mail is received, the process proceeds to step S2, in which whether an application is being activated or not is checked.

If the application is being activated, the process proceeds to step S3, in which a key input determination criterion corresponding to the currently activated application is acquired from, for example, the determination criteria table 52 as shown in FIG. 3A in which it is determined for each application.

Subsequently, in step S4, the key input state is read from the key detecting unit 40. Subsequently, in step S5, the determination criterion of key inputs obtained in step S3 and the detected key input state read in step S4 are compared with each other, and whether it is in an application prioritized key input state or not is determined.

For example, when the currently activated application is the game in the determination criteria table 52 of FIG. 3A, since "key input within 5 seconds" is set as the key input determination criterion 56 of receipt display priority, it is compared with the time interval of key inputs as a detection value of the key input state at this point, it is determined to be the application prioritized key input state if the time interval of the key inputs is within 5 seconds, and the process proceeds to step S6, in which the small PICT 68 serving as a small icon indicating a receipt notification is displayed at the corner of the application screen 66 as shown in FIG. 4A.

On the other hand, if the interval time of the key inputs read as the detection value of the key input state in step S5 exceeds 5 seconds which are the determination criterion of the key inputs, a receipt notification prioritized key input state is determined, and the, process proceeds to step S7, in which the enlarged receipt notifying message 70 is displayed at the center of the front of the application screen 66 so that it is noticeable as shown in FIG. 4B.

Note that, in order to ensure realtime performance of the receipt notification, loading of the key input state may be always determined independently from the receipt while an application is activated, and, upon receipt, the receipt method may be determined by using the latest determination state.

Subsequently, whether the mail is opened or not is checked in step S8, the receipt display is deleted in step S9 if the mail is opened, and the processes from step S1 are repeated until there is a stop instruction in step S10.

Meanwhile, if the mail is not opened in step S8, the process returns to step S4, and the key input state is loaded in the state in which application screen prioritized receipt notification display or receipt notification prioritized display is performed in S6 or S7. If a key input state that is different from the current key input state is determined in step S5, the display state of the receipt notification is switched.

More specifically, when there is no key input operation in the application screen. prioritized display state of the receipt notification of FIG. 4A, according to this key input state, the receipt notification prioritized key input state is determined, and it is switched to enlarged receipt display in which the receipt message 70 like that of FIG. 4B is largely displayed at the center of the application screen 66 in step S7.

On the other hand, if currently in the display state of the receipt notification like that of FIG. 4B in which the receipt notification message 70 is enlarged and displayed at the center of the application screen 66, it is determined that the user has begun key input in order to use the application, and the application prioritized key input state is determined, thereby proceeding to step S6, in which it is switched to a downsized receipt notification in which the PICT 68 is displayed as a receipt notification at a corner of the application screen 66 like FIG. 4A.

Note that, if it is a standby screen wherein no application is activated when the mail is received in step S2, the process proceeds to step S7, in which the enlarged receipt display of FIG. 4B is performed.

Figure 6:
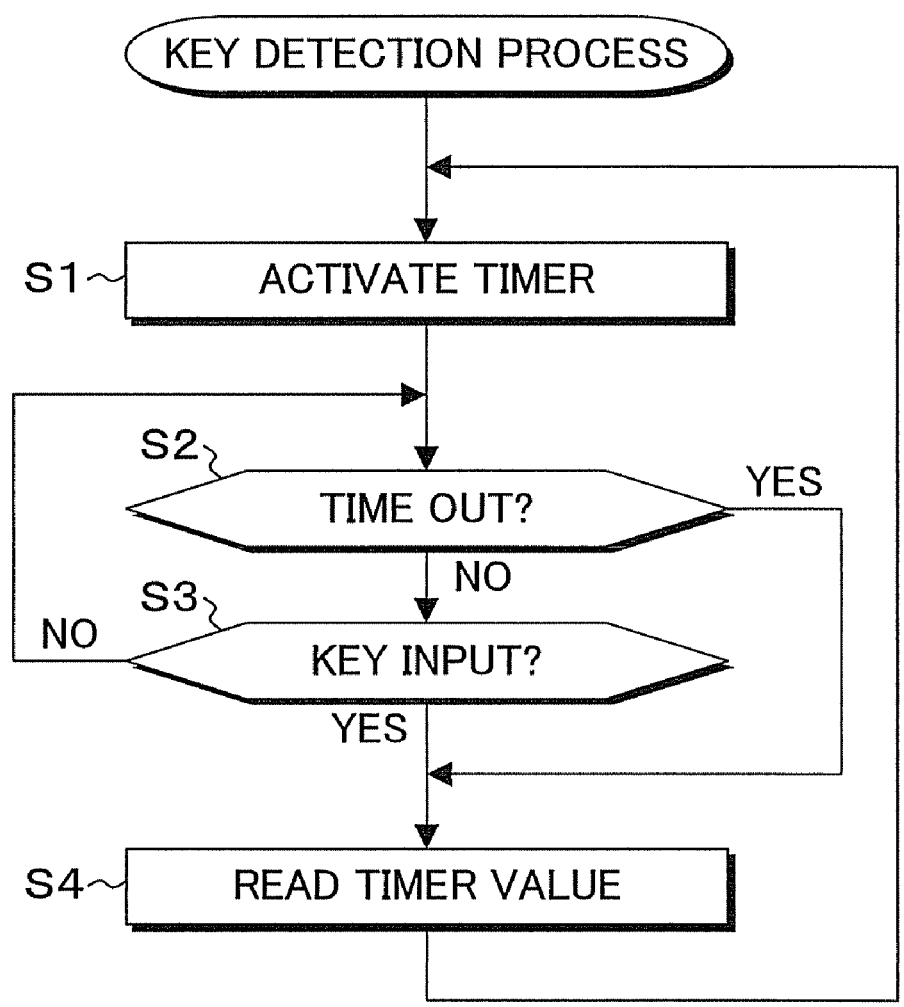
FIG. 6 is a flow chart of a detection process of the key input state in the present invention.

FIG. 6 is a flow chart of a key detection process by the key detecting unit 40 of FIGS. 2A and 2B using the timer 46. In this key detection process, the timer is activated in step S1, whether it is timeout or not is checked in step S2, and whether there is a key input or not is checked until timeout in step S3.

During this timer activation, when a key input is determined in step S3, the process proceeds to step S4, in which the timer value at that point is read. After the timer value is read, the process returns to step S1, and the timer is reset and started.

In step S2 during timer activation, if time runs out with respect to maximum time Tmax countable by the timer, after the timer value is read in step S4, the process returns to step S1, and a process of reactivating the timer is repeated.

FIGS. 7A to 7D are time charts of the key detection process of FIG. 6. FIG. 7A shows a timer operation of the case in which there is no key input, wherein, after the timer is activated at time t1 in step S1 of FIG. 6, whether time has run out or not is repeatedly detected in step S2. The time of the timer runs out at time t5 when it reaches Tmax that is the maximum time, the process proceeds to step S2 to step S4, and the timer value Tmax at that point is read.

FIGS. 7B to 7D show a timer operation and timer read values when there are key inputs. After the timer is activated at time t1, key inputs are performed at time t2, t3, and t4, respectively, as shown in FIG. 7B.

With respect to the key inputs, in the timer operation of FIG. 7C, a first key input is determined at the time t2, and the timer is activated again after the timer value T1 at that point is read. When a key input is determined at the next time t2, the timer is activated again after time T2 at this point from the time t2 is read as a timer value.

Furthermore, when there is an input at the time t4, the elapsed time t3 from the time t2 is read as a timer value, and the timer is activated again.

Through such key detection process of FIGS. 7A to 7D using the timer, the timer read values retained at that point are loaded in the reading of the key input state of step S4 of FIG. 5, thereby comparing them with the time serving as a determination criterion of key inputs, for example, 5 seconds.

Note that the detection of the time intervals of key inputs is not limited to that of the flow chart of the key detection process of FIG. 6. A timer having sufficient duration time may be utilized to load time data at the point when a key input operation is detected, and the time interval of the key inputs may be detected according to the difference with the previous key input time data.

Figure 8A:
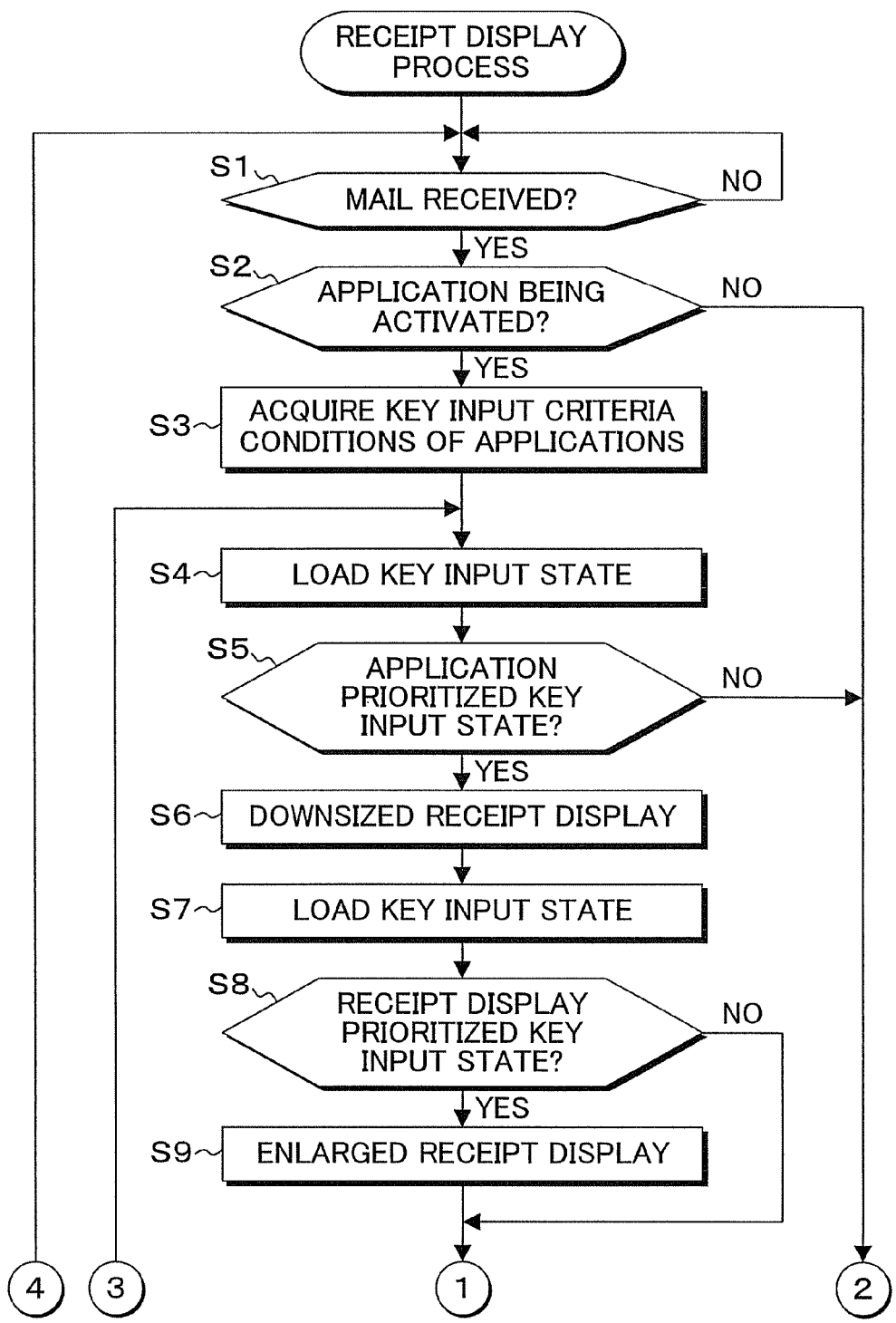
FIGS. 8A and 8B are flow charts of a receipt notifying process according to the present invention in which two steps of the key input determination criteria for receipt notification display are set.
Figure 8B:
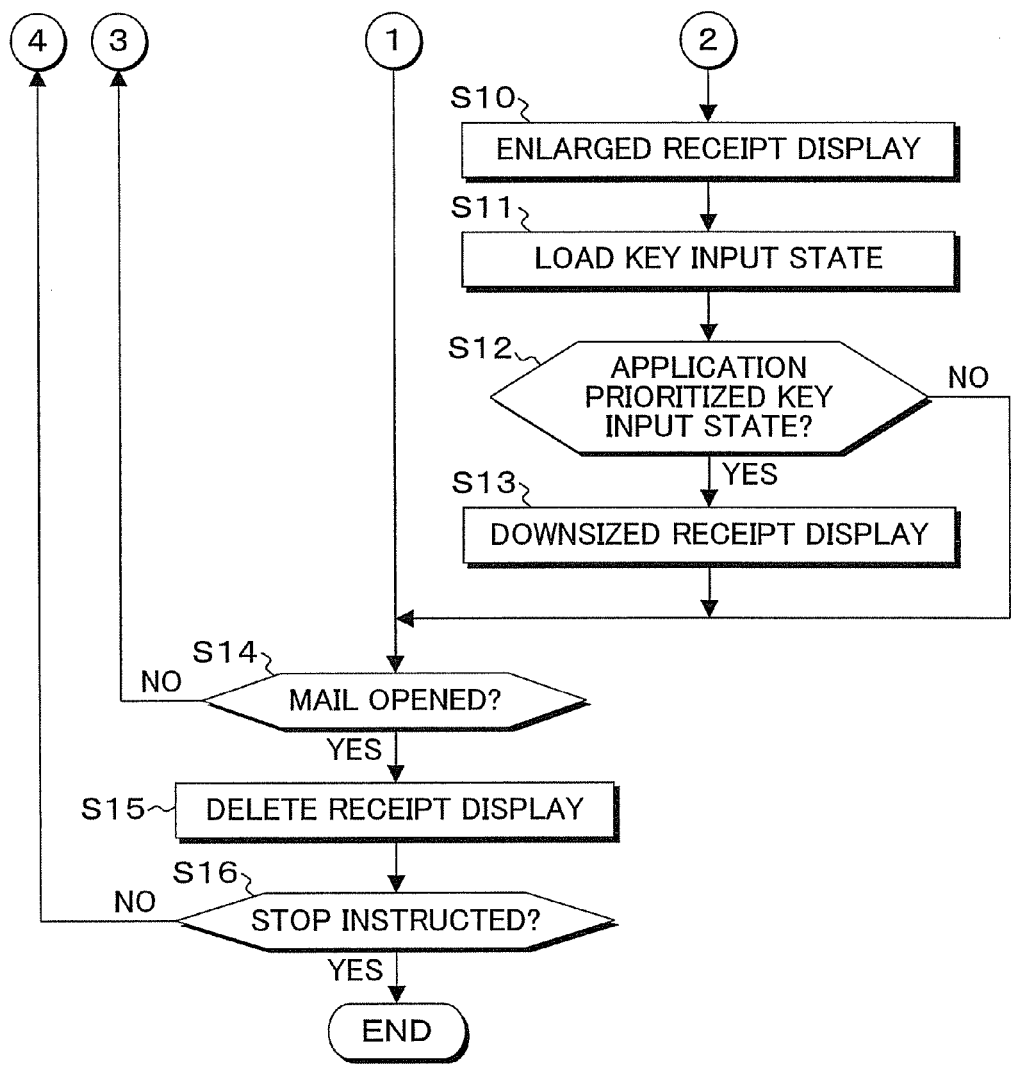

FIGS. 8A and 8B are flow charts of a receipt notifying process according to the present invention in the case in which the key input determination criteria used when a receipt notification is to be displayed first and the key input determination criteria for switching the receipt notification display thereafter are individually set by using the determination criteria table 58 of FIG. 3B.

In FIGS. 8A and 8B, when a mail receipt is determined in step S1, whether an application is being activated or not is checked in step S2, and, if the application is being activated, the process proceeds to step S3, in which the key input determination criterion corresponding to the application is acquired. Subsequently, in step S4, after the key input state is detected, whether it is the application prioritized key input state or not is checked in step S5.

If it is the application prioritized key input state, the process proceeds to step S6, in which the application prioritized downsized receipt display like FIG. 4A is performed. Meanwhile, if the receipt notification prioritized key input state is determined, the process proceeds to step S10, in which receipt notification prioritized enlarged notification like FIG. 4B is performed.

After the application prioritized downsized receipt display is performed in step S6, the key input state is detected again in step S7, and whether it is the receipt display prioritized key input state or not is determined in step S8. If key inputs have been stopped, and it is determined to be the receipt display prioritized key input state, the process proceeds to step S9, in which the current state of the downsized receipt display of FIG. 4A is switched to the state of the enlarged receipt display of FIG. 4B.

This point is also same in the case of step S10 in which enlarged receipt display is currently performed. The key input state is detected in step S11, and, if the application prioritized key input state is determined in step S12, the process proceeds to step S13, in which the state of the current enlarged receipt display of FIG. 4B is switched to the state of the downsized receipt display of FIG. 4A.

Then, mail-open is checked in step S14, and the receipt display is deleted in step S15 if the mail is opened, and the processes from step S1 are repeated until there is a stop instruction in step S16. In step S2, if it is a standby screen in which no application is activated, the process proceeds to step S10, in which the enlarged receipt display of FIG. 4B is performed.

Furthermore, the present invention provides a receipt notifying program executed by a computer of the mobile phone apparatus, and the receipt notifying program is realized by the processing procedure of the flow chart of FIG. 5 or the flow chart of FIGS. 8A and 8B.

The program of the receipt notifying process of the present invention is executed by the hardware resources of the computer such as the MPU 18 of the control board 12 shown in FIGS. 2A and 2B. In the MPU 18, a RAM, a numerical keypad, and a device controller of the display are connected to a bus of a CPU. The receipt notifying program of the present invention is loaded in the RAM and read from the RAM upon activation of the MPU 18 so that it is deployed to the RAM and executed by the CPU.

Note that, although the above described embodiments took the mobile phone as an example of a mobile terminal apparatus. However, the present invention is not limited thereto, and an arbitrary mobile terminal apparatus can be applied without modification as long as it is a mobile terminal apparatus using a display that is small such that the entire screen is occupied when an application is activated.

Moreover, the display contents of the application prioritized receipt notification display and the receipt notification display prioritized receipt notification shown in FIGS. 4A and 4B are not limited thereto. When an application is prioritized, an arbitrary receipt notification that can notify receipt without interrupting the application screen may be displayed; and, in a receipt notification prioritized display screen, arbitrary display that displays a receipt notification such that it is noticeable on the front of the application screen may be performed.

Moreover, the present invention includes arbitrary modifications that do not impair the object and advantages thereof and is not limited by the numerical values shown in the above described embodiments.

The invention claimed is:

1. A non-transitory computer-readable storage medium which stores a program causing a mobile terminal apparatus having a keyboard to execute:
   a keystroke detecting step of detecting a state of keystroke to the keyboard with respect to an active application when data such as a mail is received;
   a determination step of determining whether display of an application screen is to be prioritized or display of a receipt notification is to be prioritized according to the detected state of keystroke; and
   a receipt display control step of displaying a first receipt notification when prioritized display of the application screen is determined and displaying a second receipt notification which is larger than the first receipt notification when prioritized display of the receipt notification is determined;
   wherein in the keystroke detecting step, a time interval of keystrokes is detected, and
   wherein in the determination step, a determination criterion of the state of keystroke interval is set in advance, the determination time of a time interval of keystrokes is set as the determination criterion, prioritized display of the application screen is determined when a detected time interval of keystrokes is equal to or less than the determination time, and prioritized display of the receipt notification is determined when the detected time interval of the keystrokes exceeds the determination time.

2. The storage medium according to claim 1, wherein in the receipt display control step, after the first receipt notification is displayed so that the notification does not affect the application screen, when prioritized display of the receipt notification is determined according to the state of keystroke in the determination step, the display is changed to display of the second receipt notification which is on the front of the application screen.

3. The storage medium according to claim 1,
   wherein in the receipt display control step, after the second receipt notification is displayed on the front of the application screen, when prioritized display of the application screen is determined according to the state of keystroke in the determination step, the display is changed to display of the first receipt notification which does not affect the application screen.

4. The storage medium according to claim 1,
   wherein in the determination step, the determination criterion is set for each application, and the determination criterion corresponding to the active application is acquired so as to determine the state of keystroke.

5. The storage medium according to claim 1,
   wherein in the determination step, as the determination criteria, a first determination criterion for displaying the receipt notification at first and a second determination criterion for changing the display of the receipt notification after the receipt notification is displayed are individually set, and
   wherein the first determination criterion is different from the second determination criterion.

6. A receipt notifying method of a mobile terminal apparatus having a keyboard comprising:
   a keystroke detecting step of detecting a state of keystroke to the keyboard with respect to an active application when data such as a mail is received;
   a determination step of determining whether display of an application screen is to be prioritized or display of a receipt notification is to be prioritized according to the detected state of keystroke; and
   a receipt display control step of displaying a first receipt notification when prioritized display of the application screen is determined and displaying a second receipt notification which is larger than the first receipt notification when prioritized display of the receipt notification is determined;
   wherein in the keystroke detecting step, a time interval of keystrokes is detected, and
   wherein in the determination step, a determination criterion of the state of keystroke interval is set in advance, the determination time of a time interval of keystrokes is set as the determination criterion, prioritized display of the application screen is determined when a detected time interval of keystrokes is equal to or less than the determination time, and prioritized display of the receipt notification is determined when the detected time interval of the keystrokes exceeds the determination time.

7. The receipt notifying method according to claim 6, wherein in the receipt display control step, after the first receipt notification is displayed so that the notification does not affect the application screen, when prioritized display of the receipt notification is determined according to the state of keystroke in the determination step, the display is changed to display of the second receipt notification which is on the front of the application screen.

8. The receipt notifying method according to claim 6, wherein in the receipt display control step, after the second receipt notification is displayed on the front of the application screen, when prioritized display of the application screen is determined according to the state of keystroke in the determination step, the display is changed to display of the first receipt notification which does not affect the application screen.

9. The receipt notifying method according to claim 6, wherein in the determination step, the determination criterion is set for each application, and the determination criterion corresponding to the active application is acquired so as to determine the state of keystroke.

10. The receipt notifying method according to claim 6, wherein in the determination step, as the determination criteria, a first determination criterion for displaying the receipt notification at first and a second determination criterion for changing the display of the receipt notification after the receipt notification is displayed are individually set, and wherein the first determination criterion is different from the second determination criterion.

11. A mobile terminal apparatus having a keyboard comprising:
- a keystroke detecting unit which detects a state of keystroke to the keyboard with respect to an active application when data such as a mail is received;
- a determination unit which determines whether display of an application screen is to be prioritized or display of a receipt notification is to be prioritized according to the detected state of keystroke; and
- a receipt display control unit which displays a first receipt notification when prioritized display of the application screen is determined and displays and controls a second receipt notification which is larger than the first receipt notification when prioritized display of the receipt notification is determined;
- wherein the keystroke detecting unit detects a time interval of keystrokes, and
- wherein the determination unit sets a determination criterion of the state of keystroke in advance, and sets determination time of a time interval of keystrokes as the determination criterion, determines prioritized display of the application screen when a detected time interval of keystrokes is equal to or less than the determination time, and determines prioritized display of the receipt notification when the detected time interval of the keystrokes exceeds the determination time.

12. The mobile terminal apparatus according to claim 11, wherein after the first receipt notification is displayed so that the notification does not affect the application screen, when prioritized display of the receipt notification is determined according to the state of keystroke by the determination unit, the receipt display control unit changes the display to display of the second receipt notification which is on the front of the application screen.

13. The mobile terminal apparatus according to claim 11, wherein after the receipt notification is displayed on the front of the second application screen, when prioritized display of the application screen is determined according to the state of keystroke by the determination unit, the receipt display control unit changes the display to display of the first receipt notification which does not affect the application screen.

14. The mobile terminal apparatus according to claim 11, wherein the determination unit sets the determination criterion for each application and acquires the determination criterion corresponding to the active application so as to determine the state of keystroke.

15. The mobile terminal apparatus according to claim 11, wherein the determination unit individually sets, as the determination criteria, a first determination criterion for displaying the receipt notification at first and a second determination criterion for changing the display of the receipt notification after the receipt notification is displayed, and
- wherein the first determination criterion is different from the second determination criterion.

* * * * *